Nov. 14, 1967
A. J. ANTHONY
3,352,758
FUEL ASSEMBLY FOR NUCLEAR REACTOR
Filed Dec. 14, 1965
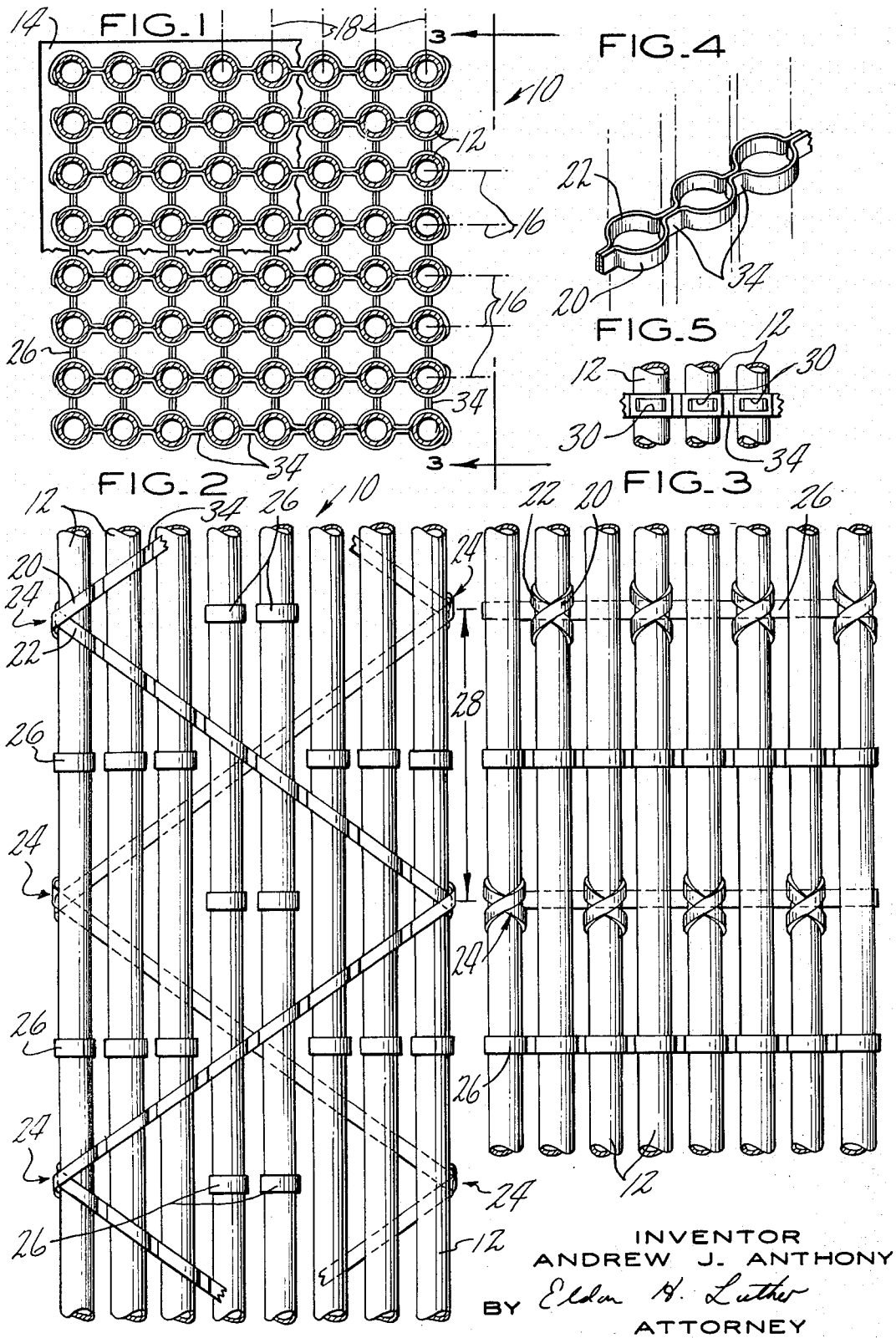
INVENTOR
ANDREW J. ANTHONY
BY Elden H. Luther
ATTORNEY United States Patent Office 3,352,758
Patented Nov. 14, 1967

3,352,758
FUEL ASSEMBLY FOR NUCLEAR REACTOR
Andrew J. Anthony, Tariffville, Conn., assignor to Combustion Engineering, Inc., Windsor, Conn., a corporation of Delaware
Filed Dec. 14, 1965, Ser. No. 513,730
8 Claims. (Cl. 176—78)

This invention relates generally to fuel assemblies as employed in nuclear reactors and has particular relation to a fuel assembly and method of fabricating the same wherein the fuel elements or rods of the assembly are banded together so as to retain them in their desired predetermined spaced relation.

Fuel assemblies as employed in nuclear reactors and with relation to which the present invention is concerned are comprised of a plurality of fuel elements or rods in the form of tubes retained in fixed relation to each other such that the assembly can, as a unit, be inserted into and removed from the core of a nuclear reactor. The tubular elements or rods have disposed therewithin a fissionable material and because they are relatively long, it is necessary to provide some arrangement at various locations throughout the length of the assembly to fixedly secure the rods or elements in their proper relation to each other so that they do not vibrate during operation of the reactor. Whatever structural arrangement is utilized to accomplish this result, it is extremely desirable that it be such as not to create excessive resistance to flow of the coolant that passes up through the fuel assembly when positioned in the core of an operating nuclear reactor. It is further necessary to avoid producing excessively high temperatures or hot spots in the fuel elements or rods where this structure engages the same, and it is additionally desirable that this support or bracing structure be such as to have the lowest possible neutron absorption characteristic.

In accordance with the present invention the fuel elements or rods of the fuel assembly are arranged in rows with these rows being disposed in two directions. In the rows in one direction the rods are maintained in their desired spaced relation by means of bands that extend in zigzag fashion throughout the length of the row. The bands extend around the tubes with there being two band members on diametrically opposite sides of the tubes. Each band member extends half way around each tube with these members being welded together intermediate the tubes. The tubes are retained in spaced relation in the rows that extend in the other direction by means of similar bands with these bands extending transversely of the tubes in generally normal relation to the tube axis. Through this arrangement the diagonally extending bands are prevented from moving longitudinally of the tubes any substantial distance during operation of the reactor, and the bands that extend normal to the tubes can move longitudinally of the tube row only a short distance permitted by the diagonally extending bands.

It is accordingly an object of this invention to provide an improved fuel assembly for a nuclear reactor.

Another object of this invention is to provide an improved method of banding together the tubes of a nuclear reactor fuel assembly in order to retain them in their desired spaced relation throughout the length of the assembly.

A still further object of the invention is to provide such an improved fuel assembly wherein the tubes are banded together at various locations throughout the length of the assembly with the banding being so constructed and arranged as to prevent its movement longitudinally of the assembly for any substantial distance.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein:

FIG. 1 is a transverse sectional view of a fuel assembly employing the improved banding arrangement of the present invention;

FIG. 2 is a fragmentary elevational view of a fuel assembly utilizing the present invention;

FIG. 3 is another fragmentary elevational view of an assembly utilizing the present invention with this plan view being taken at 90° with relation to that of FIG. 2 and being taken generally from line 3—3 of FIG. 1;

FIG. 4 is a detailed perspective view, fragmentary in nature, illustrating the structural details of the bands; and FIG. 5 is a fragmentary front elevational view showing a modified band arrangement.

Referring now to the drawings, wherein like reference characters are used throughout to designate like elements, the illustrative and preferred embodiment of the invention depicted therein comprises a fuel assembly 10 for a nuclear reactor. This assembly is made up of a substantial number of tubes 12 which extend between and have their ends secured to end plates 14, one of which is shown in FIG. 2. The assembly forms a unit which is such that it can be inserted into and removed from the core of a nuclear reactor when desired. The tubes 12, which may be as much as 14 feet in length and approximately ¼ to ½ inch in diameter, have contained therewithin a fissionable material, as for example powdered $UO_2$ or $UC$ in pellet form or compacted by vibratory compaction with the tubes being sealed so as to prevent contact of this fissionable material by the coolant.

The assembly 10 is adapted to be retained in the core of a nuclear reactor with the tubes 12 in spaced relation, as shown, such that the coolant can pass up through the assembly and over and between the tubes and can remove the heat that is produced by fission of the fissionable material within the tubes.

Because of the relatively long length of the tubes and their relatively small diameter, it is necessary to provide means to prevent vibration of the tubes during operation of the reactor and to maintain the tubes in their properly spaced relation.

In accordance with the present invention this is achieved by means of bands that extend about the tubes and extend across the rows of tubes. In the illustrative embodiment the tubes that make up the fuel assembly are retained in bi-directional rows with the rows in one direction being identified as 16 while the rows in the other direction as 18.

In the rows 16 the bands extend diagonally across the rows in zigzag fashion as best shown in FIG. 2 with the bands starting at the upper extremity of the fuel assembly and extending diagonally back and forth across the rows 16 to the lowermost extremity. The band is made up of two band members 20 and 22, each of which extends half way around the tube in diametrically opposite relation to each other with these band members being welded together at the location 24 intermediate the tubes. This welding may be accomplished by electric resistance or so-called spot welding. Through this arrangement the band snugly embraces the tubes and because of the diagonal arrangement of the bands in the rows 16, they are effectively prevented from moving longitudinally of the tubes during operation of the reactor. The flow of coolant over the tubes in the reactor is at a relatively high velocity and it has a substantial tendency to move the bands longitudinally of the tubes. To accomplish this with the arrangement of the invention, the diagonally disposed bands would have to either be stretched or compressed, and it is not possible to accomplish this to any substantial degree. Thus the bands remain in place.

In forming the diagonally arranged bands in each row 16 of tubes 12, it is preferred to have the band members 20 and 22 be continuous with this arrangement being shown in FIGS. 2 and 3 wherein the band members are wrapped around the outermost tubes of the rows 16 with one of the band members crossing over the other. In lieu of this arrangement each diagonally arranged band may be formed separately and adjacent bands welded together at their extremities.

It is preferred that the diagonally arranged bands in alternate rows 16 be longitudinally displaced as shown in FIG. 2 such that the extremities 24 of the diagonal bands of adjacent rows 16 are on opposite sides of the assembly 10 as shown.

Since the diagonally arranged bands of the rows 16 are effective to prevent movement of the bands longitudinally of the tubes, the bands that extend across the rows 18 need not be diagonally arranged and in the illustrative embodiment these bands are shown as extending horizontally across the row or in other words generally normal to the tubes 12. These bands are formed in the same manner as the diagonally arranged bands, i.e., being made up of two band members that extend in diametrically opposed relation half way around the tubes and secured together intermediate the tubes by welding. These horizontally extending bands, identified as 26, are each independent, i.e., they are not joined together. However, movement of the bands longitudinally of the tubes is restricted to a maximum distance identified as 28 because of the diagonally arranged bands. The horizontally extending bands 26 extend all the way around the outermost tube of each of the rows 18. If two separate band members such as 20 and 22 are utilized, they will be welded together at a location where they extend around the outermost tube. If one continuous strip makes up the two band members, then this strip will extend around one of the outermost tubes and the ends of the strip will be welded together where it extends around the other outermost tube of the row.

The tubes 12 and the band members 20 and 22 may be made of any material conventionally employed in nuclear reactors. For instance, stainless steel as well as zirconium or aluminum or alloys or combinations thereof may be utilized. The bands may be approximately ⅛ inch wide and .015 inch thick and may be effectively disposed at 8 inch intervals longitudinally of the tube rows. Thus with the diagonal arrangement the diagonal will cover a distance of 4 inches longitudinally of the tube row.

Because the bands are relatively thin and also quite narrow, good cooling is provided at the location where they engage the fuel elements. This cooling characteristic can be enhanced, if desired, by slotting the bands as shown in FIG. 5, i.e., providing slot 30 in the band members 22 and 24 at the location where they engage the fuel element. This may be of advantage particularly when zirconium tubing is utilized for the fuel elements since problems encountered with high temperature with this metal are severe.

It will be appreciated that with the method and construction of the present invention a relatively simple yet highly satisfactory fuel assembly is provided wherein the tubes are maintained in proper spaced relation throughout the length of the assembly and are prevented from any substantial or excessive vibration during operation of a reactor within which the assembly may be utilized.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A fuel assembly for a nuclear reactor comprising in combination a plurality of parallel spaced tubular elements at least some of which contain a fissionable material and retained in bi-directional rows, said fuel elements in each of the rows in one of said directions being banded together by bands that extend about the tubes with said bands extending diagonally across the row of tubes in a manner so as to prevent any substantial movement between successive bands longitudinally of the tubes.

2. The fuel assembly of claim 1 wherein the bands are formed by means of a first band member that extends half way around each of the tubes and a second band member that extends around each of said tubes in diametrically opposite relation to said first band, said bands meeting and being secured together intemediate the tubes with said bands being wrapped around the tube at the outermost extremity of each row such that the diagonally arranged bands are formed of two continuous members.

3. The fuel assembly of claim 1 wherein bands that are consecutively disposed longitudinally throughout the row of tube elements are joined together.

4. The fuel assembly of claim 1 wherein consecutively arranged bands are in generally opposite diagonal relation with regard to the row of tubes in said one direction.

5. The fuel assembly of claim 1 wherein said bands extend in zigzag relation across each of the rows in said one direction with adjacent bands being joined.

6. The fuel assembly of claim 1 wherein band members are provided to join the tubes in each of the rows in the other of said directions.

7. The fuel assembly of claim 6 wherein said band members joining the tubes in each of the rows in said other direction extend generally normal to the tubes in said rows with these band members extending about said tubes and being joined together intermediate said tubes.

8. The fuel assembly of claim 1 wherein said bands include narrow metallic members extending about the tubular fuel elements, said bands being provided with slots at the location of their engagement with the fuel element.

References Cited

UNITED STATES PATENTS

| 2,938,848 | 5/1960 | Ladd et al. | 176—78 X |
| 3,068,163 | 12/1962 | Currier et al. | 176—78 |
| 3,150,057 | 9/1964 | Monson et al. | 176—78 |
| 3,158,549 | 11/1964 | Fowler | 176—78 |

CARL D. QUARFORTH, *Primary Examiner.*

M. J. SCOLNICK, *Assistant Examiner.*